(12) United States Patent
Hovland et al.

(10) Patent No.: US 10,288,750 B2
(45) Date of Patent: May 14, 2019

(54) DEVICE FOR ATTACHING A SEISMIC NODE TO A CABLE, A SEISMIC NODE, AS WELL AS METHODS FOR DEPLOYMENT AND RETRIEVAL OF SEISMIC NODES ATTACHED TO A CABLE

(71) Applicant: inApril AS, Oslo (NO)

(72) Inventors: Vidar Hovland, Hagan (NO); Malte Svensson, Karlstad (SE); Vidar Pedersen, Fredrikstad (NO)

(73) Assignee: INAPRIL AS, Oslo (NO)

( * ) Notice: Subject to any disclaimer, the term of this patent is extended or adjusted under 35 U.S.C. 154(b) by 0 days.

(21) Appl. No.: 15/548,625

(22) PCT Filed: Feb. 11, 2016

(86) PCT No.: PCT/NO2016/050022
§ 371 (c)(1),
(2) Date: Aug. 3, 2017

(87) PCT Pub. No.: WO2016/130019
PCT Pub. Date: Aug. 18, 2016

(65) Prior Publication Data
US 2018/0031717 A1    Feb. 1, 2018

(30) Foreign Application Priority Data

Feb. 11, 2015   (NO) .................................. 20150200

(51) Int. Cl.
*G01V 1/20*    (2006.01)
*B63B 21/66*   (2006.01)
(Continued)

(52) U.S. Cl.
CPC .............. *G01V 1/202* (2013.01); *B63B 21/66* (2013.01); *G01V 1/201* (2013.01); *G01V 1/3852* (2013.01); *B63B 35/04* (2013.01); *G01V 1/38* (2013.01)

(58) Field of Classification Search
CPC ....... G01V 1/38; G01V 1/3843; G01V 1/3852
See application file for complete search history.

(56) References Cited

U.S. PATENT DOCUMENTS 3,209,718 A   10/1965  Rather et al.
5,456,199 A   10/1995  Kernkamp
(Continued)

FOREIGN PATENT DOCUMENTS

WO   2012/085223   6/2012
WO   2015/133908   9/2015
(Continued)

OTHER PUBLICATIONS

International Search Report dated May 26, 2016 in corresponding International Application No. PCT/NO2016/050022.
(Continued)

*Primary Examiner* — Frederick L Lagman
(74) *Attorney, Agent, or Firm* — Wenderoth, Lind & Ponack, L.L.P.

(57) ABSTRACT

It is described an attachment device (2) for attaching a seismic node to a cable (1), the attachment device comprising an in-line fastening device (6) fastening the cable (1); and at least one locking device (3) securing the cable (1) in the at least one in-line fastening device (6). The locking device (3) prevents the cable (1) from escaping the fastening device (6). A seismic node and a method for deployment and retrieval of a number of seismic nodes are also described.

23 Claims, 6 Drawing Sheets

(51) Int. Cl.
*G01V 1/38* (2006.01)
*B63B 35/04* (2006.01)

(56) References Cited

U.S. PATENT DOCUMENTS

| | | | | |
|---|---|---|---|---|
| 6,024,344 | A | 2/2000 | Buckley et al. | |
| 6,385,132 | B1* | 5/2002 | Sackett | G01V 1/16 367/106 |
| 7,260,024 | B2* | 8/2007 | Goujon | G01V 1/16 181/122 |
| 8,226,328 | B2* | 7/2012 | Thompson | G01V 1/201 367/15 |
| 9,494,700 | B2* | 11/2016 | Henman | B63B 21/66 |
| 9,611,018 | B2* | 4/2017 | Gateman | B63G 8/001 |
| 2005/0052951 | A1* | 3/2005 | Ray | G01V 1/166 367/188 |
| 2009/0135673 | A1* | 5/2009 | Bedwell | G01H 9/004 367/149 |
| 2013/0215714 | A1 | 8/2013 | Meunier | |
| 2014/0153362 | A1* | 6/2014 | Tenghamn | G01V 1/3852 367/20 |
| 2015/0003917 | A1 | 1/2015 | Masters et al. | |
| 2015/0331126 | A1 | 11/2015 | Lambert et al. | |
| 2015/0362606 | A1 | 12/2015 | Henman et al. | |

FOREIGN PATENT DOCUMENTS

| | | |
|---|---|---|
| WO | 2015/175646 | 11/2015 |
| WO | 2015/189415 | 12/2015 |

OTHER PUBLICATIONS

International Preliminary Report on Patentability dated Jun. 6, 2017 in corresponding International Application No. PCT/NO2016/050022.

Norwegian Search Report dated May 22, 2015 in corresponding Norwegian Application No. 20150200.

* cited by examiner

DEVICE FOR ATTACHING A SEISMIC NODE TO A CABLE, A SEISMIC NODE, AS WELL AS METHODS FOR DEPLOYMENT AND RETRIEVAL OF SEISMIC NODES ATTACHED TO A CABLE

INTRODUCTION

The present invention concerns a device for attaching a seismic node to a cable, a seismic node, as well as a method for deployment and retrieval of seismic nodes attached to a cable.

BACKGROUND

Seismic surveying is performed using a number of different solutions. Example solutions are e.g. seismic streamer cables towed behind a vessel, ocean bottom seismic cables, or autonomous seismic recorders/nodes arranged on the ocean bottom. The autonomous seismic recorders may be individually placed on the ocean bottom by e.g. remotely operated vehicles, or by dropping the seismic recorders in the sea from a vessel. Alternatively, the autonomous seismic recorders may be arranged on the ocean bottom attached to a cable deployed from a vessel. In the prior art solutions, the seismic recorders are attached to the cable in predetermined positions along the cable defined by connection points on the cable. There is a need for more efficient seismic surveying reducing the time and thereby costs involved.

SUMMARY OF THE INVENTION

The invention is conceived to solve or at least alleviate the problems mentioned above.

In a first aspect the invention provides an attachment device for attaching a seismic node to a cable comprising at least one in-line fastening device for fastening the in-line fastening device to the cable; and at least one locking device securing the cable in the at least one in-line fastening device.

The at least one in-line fastening device may be adapted to provide fastening by an in-line force of the cable. The at least one in-line fastening device may be adapted to provide increased fastening of the in-line fastening device to the cable as the in-line forces from the cable increases. The at least one in-line fastening device may further comprise a number of oppositely arranged ridges for fastening of the in-line fastening device to the cable. In an embodiment at least two locking devices may be provided, where a locking device is arranged on opposite sides of the at least one in-line fastening device. The at least one locking device may be adapted to be pushed open upon engagement with the cable, for thereby returning to a locking position securing the cable. The locking device may include a biased resilient member for returning the locking device to a locking position. The attachment device may comprise a housing having an opening at one end for receiving the cable, wherein the at least one in-line fastening device is arranged inside the housing facing the opening. The housing may comprise a back wall and a top part. The at least one in-line fastening device and the at least one locking device may be passive devices.

The invention also provides a seismic node comprising a device for attaching the seismic node to a cable as described above. The attachment device may be arranged on an upper side of the seismic node ensuring the front side of the node is facing down on the ocean bottom. The front side and the upper side may be opposite sides. The cable may be arranged in a non-centered position in the attachment device.

The invention further provides a method for deploying a number of seismic nodes as defined above into the sea, the method comprising: deploying a cable into the sea, attaching the seismic nodes to the cable during deployment, wherein each seismic node is attached to the cable by the following method: pushing the at least one locking device to an open position; inserting the cable passed the at least one locking device, whereby the at least one locking device returns to a locking position, and fastening the cable to the at least one in-line fastening device by the cable movement in a longitudinal direction of the cable.

A guiding tool may be used for bringing the cable and the at least one seismic node locking device towards each other before pushing the at least one locking device to an open position. The guiding tool may be running on tracks causing the guiding tool to move towards the at least one seismic node locking device causing the opening of the at least one locking device, guiding the cable passed the at least one locking device towards the at least one in-line fastening device, and moving away from the at least one locking device whereby the at least one locking device returns to a locking position.

The invention also provides a method for retrieving a number of seismic nodes as described above, attached to a cable from the sea, the method comprising: retrieving the cable, detaching each of the seismic nodes from the cable during retrieval by: pushing the at least one locking device to an open position; moving the cable passed the at least one locking device, whereby the at least one locking device returns to its closed position, and whereby the movement of the cable releasing the cable from the at least one in-line fastening device of the seismic node. A guiding tool may be used for pushing the at least one locking device to an open position. At least one guiding edge may be used for pushing the at least one locking device to an open position. The movement of the cable releasing the cable from the at least one in-line fastening device of the seismic node may be provided by a swinging arm.

A guiding tool may be used for bringing the cable and the at least one seismic node locking device towards each other. The guiding tool may also be in the form of a guiding wheel guiding the cable during deployment and retrieval of the cable. The cable may be a rope or a wire.

The attachment device firmly attaches the seismic node to the cable and avoids in-line sliding along the cable without use of connection points along the cable. The seismic nodes are thus attached to a clean cable. A clean cable without connecting points results in a flexible solution with regard to where seismic nodes may be attached to the cable and also with respect to distances between the seismic nodes along the cable.

The attachment device for attaching a seismic node to a cable according to the invention enables a simple design without moving parts. The attachment device may also be constructed without use of metal avoiding corrosion. The attachment device is simple in construction, reliable and fast in operation and enables increased speed of the vessel during deployment and retrieval of the cable and seismic nodes. This result in better efficiency and thereby decreased costs due to the reduction in time spent on the seismic surveying operations.

BRIEF DESCRIPTION OF DRAWINGS

Embodiments of the invention will now be described with reference to the followings drawings, where:

FIG. 1b is a schematic illustration in top view of a an attachment device illustrating internal details of an embodiment of the attachment device from FIG. 1a;

DETAILED DESCRIPTION

The present invention will be described with reference to the drawings. The same reference numerals are used for the same or similar features in all the drawings and throughout the description.

Figure 1:
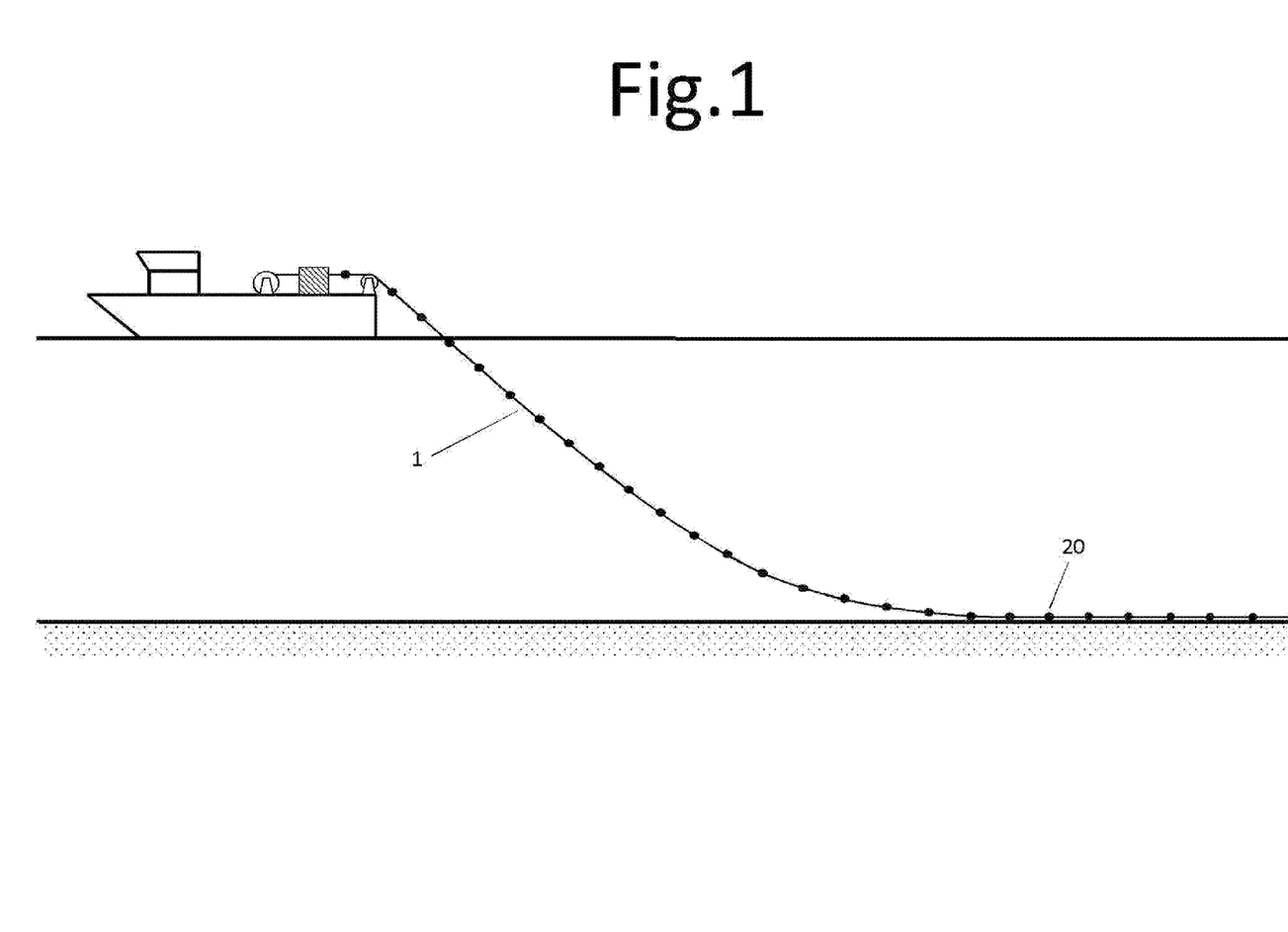
FIG. 1 is a schematic illustration of a vessel deploying a number of seismic nodes attached to a cable on the sea floor/ocean bottom.

FIG. 1 illustrates a vessel deploying a number of seismic nodes 20 attached to a cable 1 on the ocean bottom. The seismic nodes are autonomous; i.e. seismic nodes contain a power source and memory for the recorded seismic data. The cable may thus be non-conducting and need not contain any external electrical wiring. The cable may e.g. be a rope or a wire. In the following description the invention is explained with reference to a cable, but a rope or a wire may also be used. The seismic nodes may be attached in any position along the cable by a snap-on mechanism. The snap-on mechanism may also function as a snap-off mechanism when removing the seismic nodes from the cable.

Figure 1A:
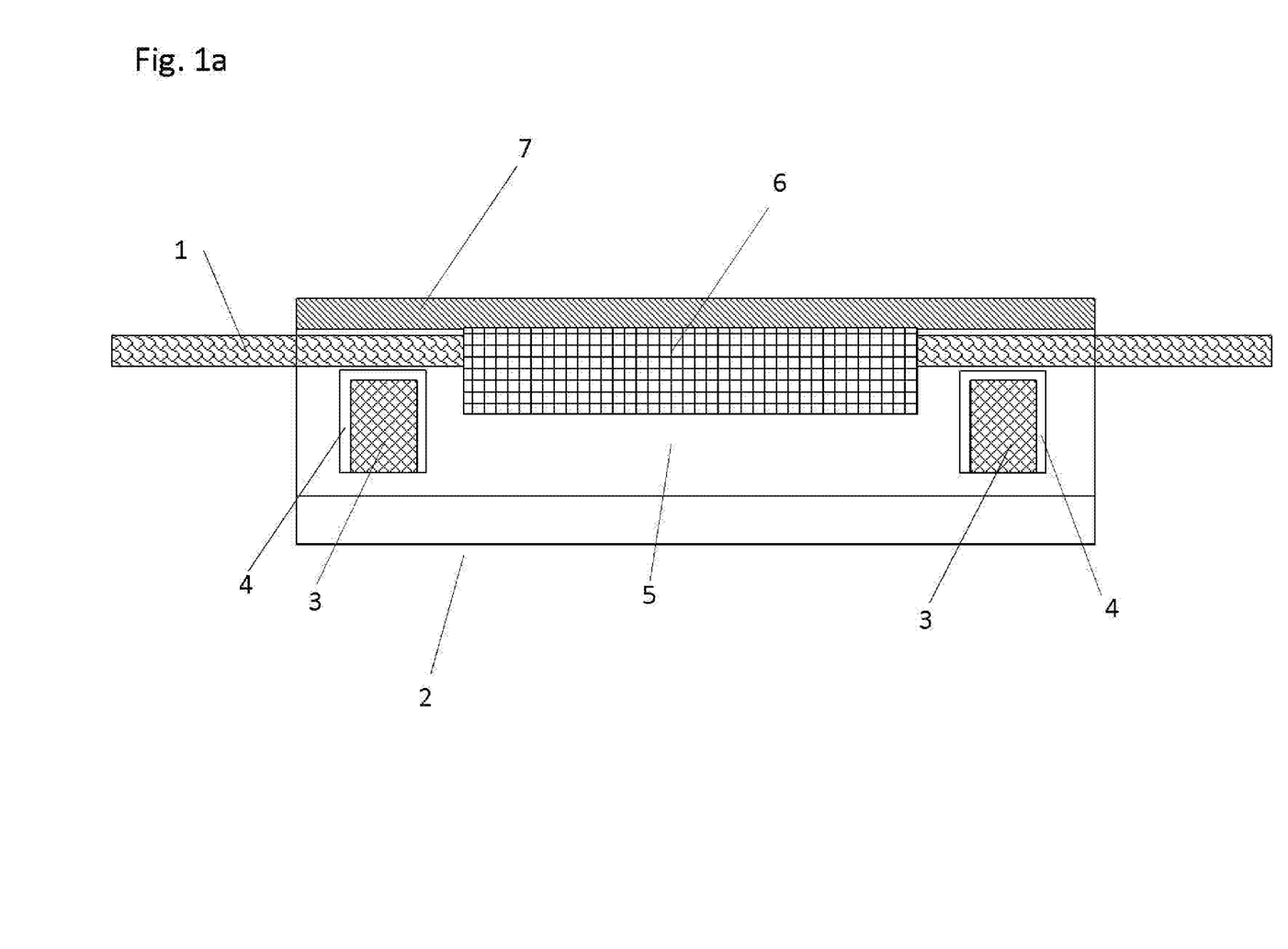
FIG. 1a is a schematic illustration in top view of an attachment device according to an embodiment of the present invention.

FIG. 1a illustrates in top view an attachment device 2 for attaching a seismic node 20 from FIG. 1 to the cable 1. The attachment device 2 firmly attaches the seismic node 20 to the cable and avoids in-line sliding along the cable without use of connection points along the cable. The attachment device 2 is arranged on an upper side of the seismic node. The attachment device 2 comprises an in-line fastening device 6 fastening the in-line fastening device to the cable 1, and two locking devices 3 securing the cable 1 in the at least one in-line fastening device 6. The in-line fastening device 6 fastens the cable 1 in-line. The two locking devices 3 prevent the cable from escaping from the fastening device 6. The cable is fastened in the in-line fastening device by in-line forces from the cable. In FIG. 1a, a locking device 3 is arranged on opposite sides of the in-line fastening device 6. This arrangement secures the seismic node to the cable preventing the cable from slipping out of the in-line fastening device. The locking devices 3 have a design ensuring the locking devices to be pushed, by own force, back to its normal position (normal position illustrated in FIG. 3b). This function may be accomplished by providing the locking devices with a resilient member. The resilient member may function as a biased hinge 10. The hinge function may also be accomplished by using a biased bolt. The locking devices 3 may also be arranged so as to guide the cable into engagement with the in-line fastening device.

Figure 1B:
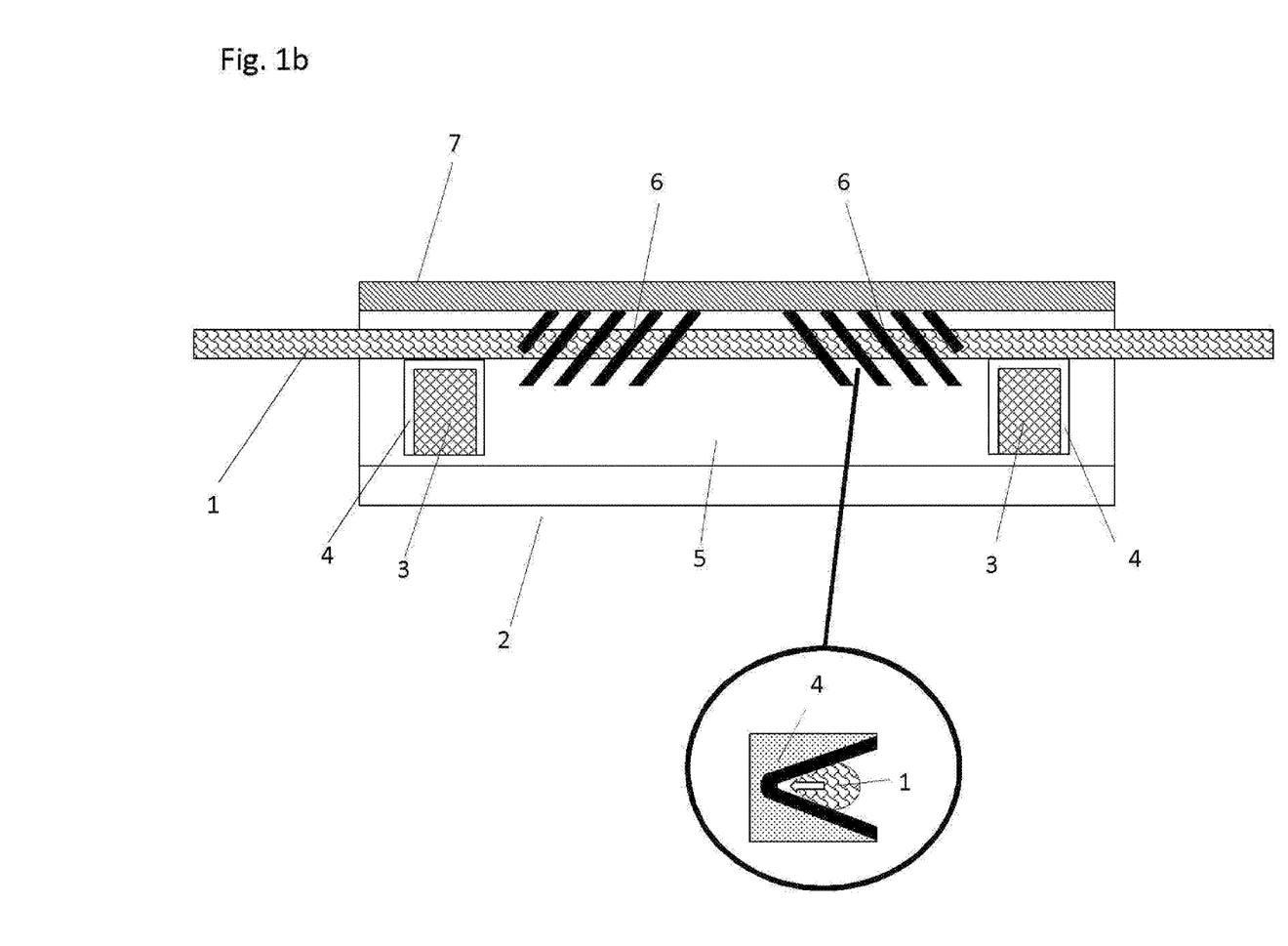

The in-line fastening device 6 provides increased fastening of the cable 1 as the in-line forces from the cable increases. The in-line forces may be due to tensile forces along the cable during deployment, retrieval or when arranged on the sea bottom. The in-line fastening device 6 provides increased fastening for forces acting in any longitudinal direction; i.e. for in-line forces having a direction along the cable both in a forward and backward longitudinal direction seen in relation to the travelling direction of the cable. The in-line fastening device 6 may comprise a first in-line fastening device providing increased fastening of the cable as the in-line force from the cable increases in a forward longitudinal direction, and a second in-line fastening device providing increased fastening of the cable as the in-line force from the cable increases in a rearward longitudinal direction. In FIG. 1a the fastening device 6 is arranged in a longitudinal direction parallel with the cable, and the locking devices 3 in a lateral direction in view of the cable, but other arrangements may also be possible. Also, further fastening devices 6 may be used depending on the size of the seismic node. The fastening devices may be arranged side by side. A locking device 3 may also be arranged between the fastening devices 6, and not only at the ends of the fastening device 6 as illustrated in FIG. 1b, providing increased securing of the cable in the in-line fastening device. The in-line fastening devices 6 and the locking devices 3 may be passive; i.e. their function may only depend on the forces resulting from the cable itself during deployment, retrieval and when placed on the sea bottom.

In use the cable may have lengths of several kilometers, and there will be a large number of seismic nodes attached to the cable. The cable should endure tensile stress resulting from a weight in the order of 10 tons at each end of the cable. The locking device 3 should also have some flexibility in order to absorb forces in the lateral direction from the cable without breaking.

In FIG. 1a a top part 5 of the attachment device 2 is illustrated as transparent for illustration purposes only, in order to better illustrate the principle of the in-line fastening device 6 and locking devices 3. The top part 5 is provided with openings 4 in order for the locking devices 3 to be able to move through the top part 5 when attaching and detaching the seismic node from the cable. The attachment device 2 may further comprise a back wall 7. The back wall 7 together with the top part 5 and locking devices 3 secure the cable from escaping in any other direction than through an opening 8 (shown in FIG. 3a). The in-line fastening device 6 and the locking devices 3 may be provided in a housing with an opening 8 for receiving the cable. The back wall 7, top part 5 and either a bottom part of the attachment device 2 or an end face of the seismic node on which the attachment device is arranged, may form the housing. The housing may have a U-shape or horse shoe like shape.

FIG. 1b schematically illustrates in top view internal details of an embodiment of the in-line fastening device 6 of the attachment device from FIG. 1a. In FIG. 1b the in-line fastening device 6 comprises oppositely arranged sloping ridges 6 for firmly fastening the cable. A first group of ridges (to the left) and a second group of ridges (to the right) are arranged at different sloping angles in order to fasten the cable due to forces acting in both longitudinal directions. The first group of ridges securely fastens the cable when the in-line force from the cable acts to the left, whereas the second group of ridges securely fastens the cable when the in-line force from the cable acts to the right in FIG. 1b. As can be seen in the detailed view of a cross section of the ridges, the ridges are arranged on interior surfaces of a slot forming a valley with decreasing cross-section. The sloping arrangement of the ridges together with the valley cross-section provides increased fastening of the cable as the in-line forces along the cable increases. The opening of the slot faces the opening 8. Examples of in-line fastening devices using ridges may e.g. be a cleat type, a camcleat type with rotation wheels, a camcleat type without rotation wheels, a jamming cleat type or a valley cleat type device. The in-line locking device 6 is not limited to a ridge type device, but may be any kind of in-line fastening mechanism fastening the cable due to the in-line force by the cable.

Figure 2:
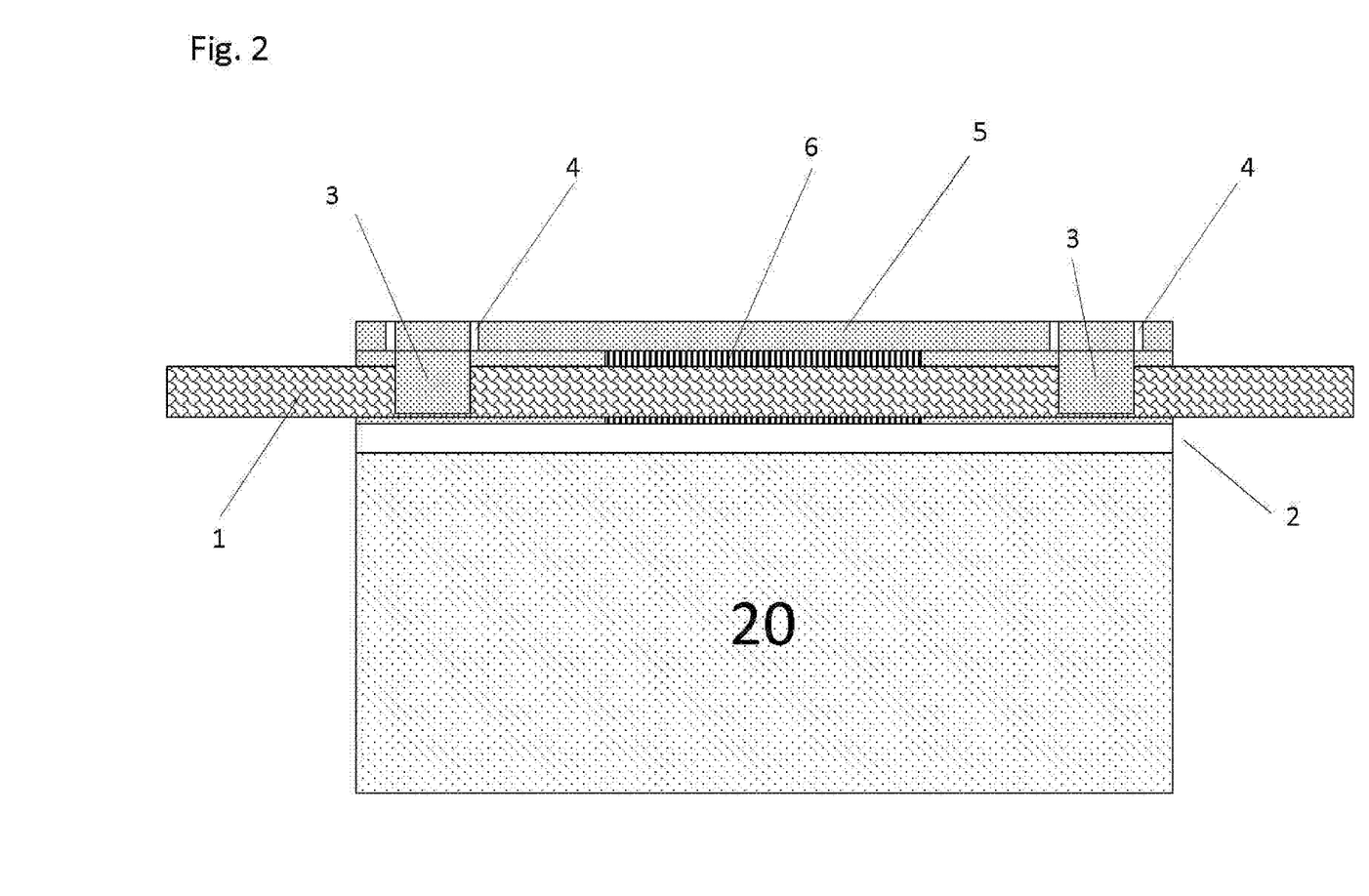
FIG. 2 is a schematic illustration in side view of a seismic node with an attachment device from FIG. 1a according to an embodiment of the invention.

A seismic node 20 with an attachment mechanism from FIG. 1a is schematically illustrated in FIG. 2 in side view. The locking device 3 is seen in a locked position securing the cable 1. In the locked position, the locking device prevents the cable from escaping from the in-line fastening device 6. The ridges in the in-line locking device 6 are also seen schematically illustrated above and under the cable 1. The in-line locking device 6 is in the embodiment in FIG. 2 also provided behind (not shown) the cable. FIG. 2 shows the top part 5 with openings 4 above the in-line locking device 6 with the cable 1 firmly fastened. The attachment device 2 may be an integrated part of the seismic node or produced as a separate part for later attachment to the seismic node. All the parts of the attachment device may be produced in a plastic material, thus avoiding use of metal.

Figure 3A:
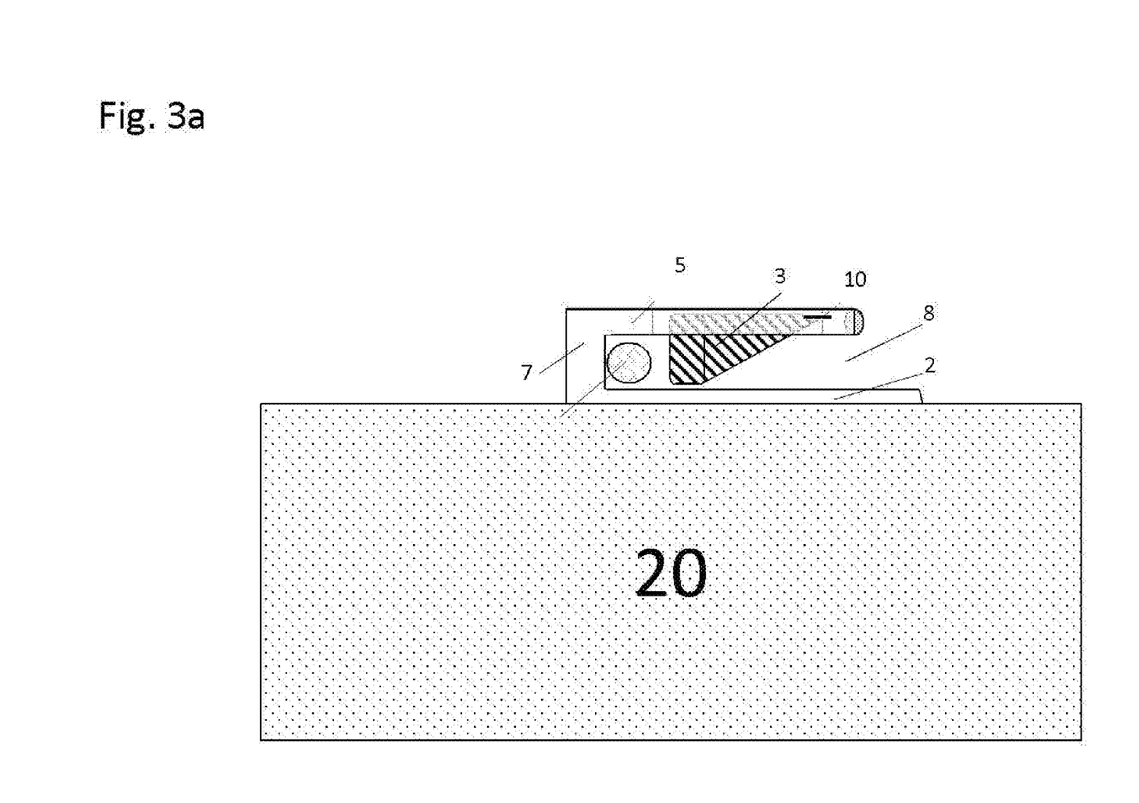
FIG. 3a is a schematic illustration in side view (in-line with the rope) of the seismic node with an attachment device from FIG. 1a according to an embodiment of the invention.

FIG. 3a is a schematic illustration in side view of the seismic node with an attachment device 2 from FIG. 2 provided on an upper side of the seismic node 20. The locking device 3 is seen in a locked position. The top part 5 is seen partly transparent to illustrate the shape of the locking device. The locking device 3 blocks the opening 8 for the cable and the top part 5 prevents upward movement of the cable 1. The locking device 3 is in the embodiment in FIG. 3a provided with a resilient member 10 attached to the top part 5. The resilient member 10 is biased in order to secure the locking device 3 in the locked position. The locked position is the normal position of the resilient member 10. The resilient member may also be attached to a lower part of the housing of the attachment device. The resilient member may be in the form of a hinge member. The locking device 3 is arranged to be pushed open upon engagement with the cable, for thereby returning to a locking position securing the cable. The locking device 3 is designed to enable the cable to come into contact with the in-line fastening device 6 when attaching the seismic node to the cable. However, after engagement, when the seismic nodes are attached to the cable, the locking device is arranged so as not to open when the cable exerts forces in a direction out of the opening 8 of the locking device.

In FIG. 3a, the in-line fastening device 6 and the locking device 3 are arranged on an upper side of the seismic node 20. When the seismic nodes are deployed on the ocean bottom, this arrangement ensures that the front side of each seismic node is facing down, ensuring seismic coupling to the sea bottom. If a seismic node is standing on a narrow side on the sea bottom, seismic sensing may not be possible at all or at least the seismic signals may be poorly detected by the sensors in the seismic node. The in-line fastening device 6 and the locking device 3 are also mutually arranged so as to ensure the cable is in a non-centered position on the narrow side of the seismic node. This avoids spinning/twirling of the seismic nodes around the cable during deployment or retrieval due to ocean currents, tidal currents or the movements by the vessel.

The cable is deployed into the sea and the seismic nodes 20 attached during deployment in positions along the cable. The cable is not provided with connection points as in the prior art solutions. The seismic nodes 20 may thus be attached in any position along the cable. These positions may be controlled by a computer. The positions may be predetermined. When attaching and detaching a seismic node to the cable, the cable and the seismic node locking devices are guided towards each other. This may be done in a number of alternative ways. The cable may be guided towards the locking device of the seismic node. Alternatively, the seismic node locking device may be guided towards the cable. In a further alternative, both the cable and the seismic node locking device may be guided towards each other. A guiding tool may be used for bringing the cable and the seismic node locking device towards each other.

Figure 3B:
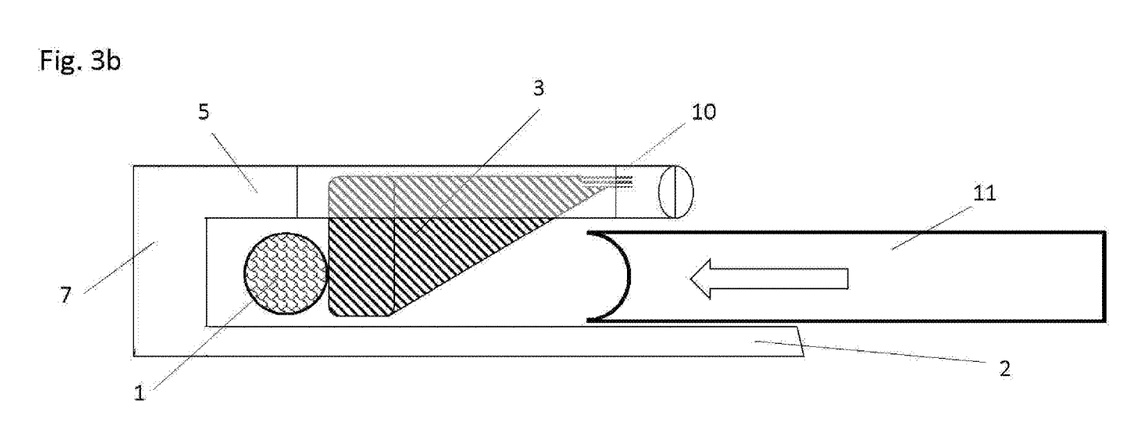
FIG. 3b is a schematic illustration in side view of the attachment device from FIG. 3a on, with a locking device in a locked position after attachment of the seismic node to the cable according to an embodiment of the invention.
Figure 3C:
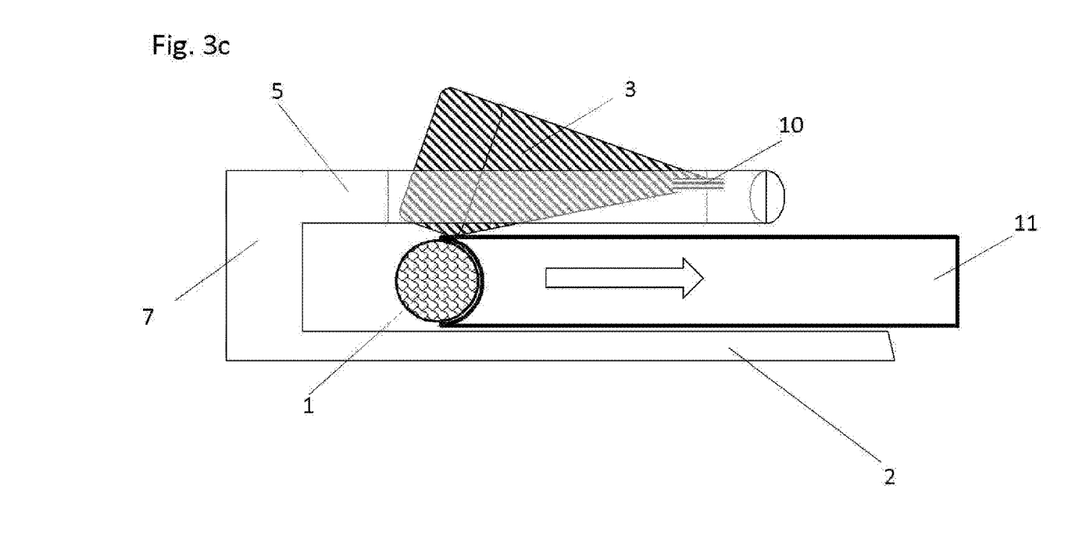
FIG. 3c is a schematic illustration in side view of the attachment device from FIG. 3a, with a locking device in an open position during detachment of the seismic node from the cable according to an embodiment of the invention.

FIG. 3b illustrates the locking device 3 in a normal (locking) position. FIG. 3c illustrate how the locking device 3 may be pushed open from the locked position by a guiding tool 11 when detaching the seismic node from the cable. The cable 1 is applying a light pressure towards the locking device 3, while the guiding tool 11 is moved in through the gap 8 and in the end pushing the locking device 3 to an open position as shown in FIG. 3c. When the locking device 3 is open, the cable move by its own force out passed the locking device 3 until the cable stops at the guiding tool 11. The cable then follows the guiding tool 11 out of the opening 8 until the cable is free from the attachment device 2. When attaching the seismic nodes to the cable for deployment into the sea, the locking device 3 is pushed open to let the cable 1 pass the locking device 3. The locking device 3 returns to the locking position avoiding the cable 1 from escaping through gap 8. The cable is further guided into the in-line locking device 6. This may be accomplished by using the guiding tool 11, or by using the movement of the cable 1 in the forward longitudinal direction. Movement between the seismic node and the cable in a longitudinal direction results in firmly fastening of the cable in the in-line fastening device 6. During deployment and retrieval the seismic nodes may be attached to/detached from the cable at the same speed as the deployment/retrieval of the cable.

In an embodiment for deployment of the seismic nodes, the cable may be running freely. The seismic nodes 20 may be attached to the cable 1 by bringing the sensor node attachment device 2 towards the cable during deployment. This may done by pushing the seismic node towards the cable by a pushing device. Before the pushing movement starts, the seismic node may be positioned with the attachment device 2 aligned in parallel with the cable and with the opening 8 facing the cable 1. When the seismic node is pushed against the cable, all the locking devices 3 will be brought into position aligned in parallel with the cable. The guiding tool comprises a seismic node acceleration device pushing the seismic node forward parallel with the cable accelerating the seismic node to rope speed. During this acceleration, the attachment device on the seismic node, and thus the node itself, is also attached to the cable 1 by the guiding tool. The seismic node is attached to the cable by the guiding tool first moving towards the attachment device 2 pushing the cable passed the at least one locking device towards the in-line fastening devices, and then moving away from the attachment device 2. The cable is firmly fastened to the in-line fastening devices by the cable movement.

The guiding tool may in this embodiment further comprise a cable engagement device pushing the cable passed the locking devices 3 and towards the in-line fastening devices 6, and then retracting from the attachment device. The guiding tool further comprises at least one opening device maintaining the locking devices 3 in the open position until the cable is in position in the in-line fastening devices 6. The at least one opening device is then retracted allowing the locking devices to return to their locked position securing the cable in the in-line fastening devices 6 before the cable engagement devices are retracted. As the cable engagement devices do not retract until after the locking devices 3 are in the closed position, this also ensures the cable is not underneath the locking devices 3 which will prevent the locking devices to reach their locking position. The opening devices push forward against an inclined edge on the locking devices 3 causing the locking devices to open and maintaining the locking devices 3 in their open position as long as the opening devices are in the forward position. The opening devices may have a fork-like shape, although other shapes may be envisaged.

Both the opening devices and the cable engagement devices may cause the cable to be pushed in place in the attachment device 2. The at least one cable engagement device and the at least one opening device may preferably have at least the same thickness as the cable. The number of cable engagement devices and the number of opening devices are adapted to the number of in-line fastening devices 6 and the number of locking devices 3 in the attachment device 2 accordingly. In an embodiment, a cable engagement device is arranged on each side of each locking device 3. The opening devices and the cable engagement devices may be arranged in a side-by-side relationship adapted to the configuration of the locking devices 3 and the in-line fastening devices in the attachment device 2.

The pushing device may be separate from or part of the guiding tool.

The movement of the guiding tool in a transversal direction towards and away from the seismic node attachment device 2 at the same time as moving forward parallel with the cable as explained above, may be accomplished by bringing the guiding tool to move forward in at least one track, e.g. a groove or rail, preferably two parallel tracks, grooves or rails. The tracks may be arranged in a curved pattern representing the movement towards, along and away from the seismic node attachment device described above in order to attach the seismic node the cable.

The deployment and retrieval/recovery of the seismic nodes may be performed with different equipment. A further embodiment for retrieval of the cable and detaching the seismic nodes from the cable uses a specially designed detachment station. The cable with the seismic nodes 20 attached passes through the detachment station during recovery detaching the seismic nodes from the cable. The seismic nodes enters the detachment station gliding on a gliding path attached to the cable. The attachment device 2 glides upon a guiding edge causing the locking devices 3 to be lifted up into the open position. The lifting up/pushing up is caused by the guiding edge having a height above the gliding path, where the height is increasing in the travelling direction of the cable. The increasing height of the guiding edge lifts up locking devices 3, one by one. The attachment device 2 may glide onto a further guiding edge maintaining the locking devices 3 in their open position as the seismic node proceeds its movement through the detachment station. After the locking devices 3 have been lifted up into their open position, the cable may be moved to the side effecting movement of the cable away from the in-line fastening devices 6 and out of the opening 8. The movement of the cable to the side may be performed by a swinging arm. The seismic node is now free from the cable and may be moved away from the detachment station.

The cable speed during deployment and retrieval may be at least 3 knots, but higher speeds may also be accomplished. The cable may e.g. be a rope or a wire.

Having described preferred embodiments of the invention it will be apparent to those skilled in the art that other embodiments incorporating the concepts may be used. These and other examples of the invention illustrated above are intended by way of example only and the actual scope of the invention is to be determined from the following claims.

The invention claimed is:

1. An attachment device for attaching a seismic node to a cable comprising:
    at least one in-line fastening device for fastening the at least one in-line fastening device to the cable, wherein the at least one in-line fastening device is adapted to provide fastening by an in-line force of the cable and wherein the at least one in-line fastening device is adapted to provide increased fastening of the cable as the in-line forces from the cable increases; and
    at least one locking device securing the cable in the at least one in-line fastening device.

2. The attachment device according to claim 1, further comprising at least two locking devices, wherein a locking device is arranged on opposite sides of the at least one in-line fastening device.

3. The attachment device according to claim 1, wherein the at least one in-line fastening device comprises a number of oppositely arranged ridges for fastening of the in-line fastening device to the cable.

4. The attachment device according to claim 1, comprising a housing having an opening at an end for receiving the cable, wherein the at least one in-line fastening device is arranged inside the housing facing the opening.

5. The attachment device according to claim 4, wherein the housing further comprises a back wall and a top part.

6. The attachment device according to claim 1, wherein the at least one locking device is adapted to be pushed open upon engagement with the cable, for thereby returning to a locking position securing the cable.

7. The attachment device according to claim 1, wherein the locking device comprises a biased resilient member for returning the locking device to a locking position.

8. The attachment device according to claim 1, wherein the at least one in-line fastening device and the at least one locking device are passive devices.

9. The attachment device according to claim 1, wherein the cable is a rope or a wire.

10. A seismic node comprising an attachment device for attaching the seismic node to a cable, wherein the attachment device comprises:
    at least one in-line fastening device for fastening the at least one in-line fastening device to the cable, wherein the at least one in-line fastening device is adapted to provide fastening by an in-line force of the cable and wherein the at least one in-line fastening device is adapted to provide increased fastening of the cable as the in-line forces from the cable increases; and
    at least one locking device securing the cable in the at least one in-line fastening device.

11. The seismic node according to claim 10, wherein the attachment device is arranged on an upper side of the seismic node ensuring a front side of the seismic node is facing down on the ocean bottom.

12. The seismic node according to claim 11, wherein the front side and the upper side are opposite sides.

13. The seismic node according to claim 10, wherein the cable is arranged in a non-centered position in the attachment device.

14. The seismic node according to claim 10, wherein the cable is a rope or a wire.

15. A method for deploying a number of seismic nodes into the sea, each of the seismic nodes comprising an attachment device for attaching the seismic node to the cable, wherein the attachment device comprises:
    at least one in-line fastening device for fastening the at least one in-line fastening device to the cable, wherein the at least one in-line fastening device is adapted to provide fastening by an in-line force of the cable; and
    at least one locking device securing the cable in the at least one in-line fastening device, and wherein the method comprises:
    deploying the cable into the sea,
    attaching the seismic nodes to the cable during deployment, wherein each seismic node is attached to the cable by the following method:
        pushing the at least one locking device to an open position by using a guiding tool;
        inserting the cable past the at least one locking device, whereby the at least one locking device returns to a locking position, and
        fastening the cable to the at least one in-line fastening device by the cable movement in a longitudinal direction of the cable.

16. The method according to claim 15, further comprising using the guiding tool for bringing the cable and the at least one seismic node locking device towards each other before pushing the at least one locking device to an open position.

17. The method according to claim 16, wherein the guiding tool is running on tracks causing the guiding tool to move towards the at least one seismic node locking device causing the opening of the at least one locking device, guiding the cable past the at least one locking device towards the at least one in-line fastening device, and moving away from the at least one locking device whereby the at least one locking device returns to a locking position.

18. The method according to claim 16, wherein the guiding tool is in the form of a guiding wheel guiding the cable during deployment and retrieval of the cable.

19. The method according to claim 15, wherein the cable is a rope or a wire.

20. A method for retrieving a number of seismic nodes attached to a cable from the sea, each of the seismic nodes comprising an attachment device for attaching the seismic node to the cable, wherein the attachment device comprises:
    at least one in-line fastening device for fastening the at least one in-line fastening device to the cable; and
    at least one locking device securing the cable in the at least one in-line fastening device, and wherein the method comprises:
    retrieving the cable,
    detaching each of the seismic nodes from the cable during retrieval by:
        pushing the at least one locking device to an open position using a guiding tool;
        moving the cable outwards past the at least one locking device, whereby the at least one locking device returns to its closed position, and
        whereby the movement of the cable releases the cable from the at least one in-line fastening device of the seismic node.

21. The method according to claim 20, further comprising using at least one guiding edge for pushing the at least one locking device to an open position.

22. The method according to claim 20, wherein the movement of the cable releasing the cable from the at least one in-line fastening device of the seismic node is provided by a swinging arm.

23. An attachment device for attaching a seismic node to a cable comprising:
    at least one in-line fastening device for fastening the at least one in-line fastening device to the cable, wherein the at least one in-line fastening device is adapted to provide fastening by an in-line force of the cable;
    at least one locking device securing the cable in the at least one in-line fastening device; and
    a housing having an opening at an end for receiving the cable, wherein the at least one in-line fastening device is arranged inside the housing facing the opening.

* * * * *